Sept. 14, 1954  H. J. HERSEY, JR  2,689,020
DUST FILTER

Filed Oct. 11, 1949  3 Sheets-Sheet 1

*INVENTOR.*
HENRY J. HERSEY, JR.
BY
*James D. Bock*
ATTORNEY

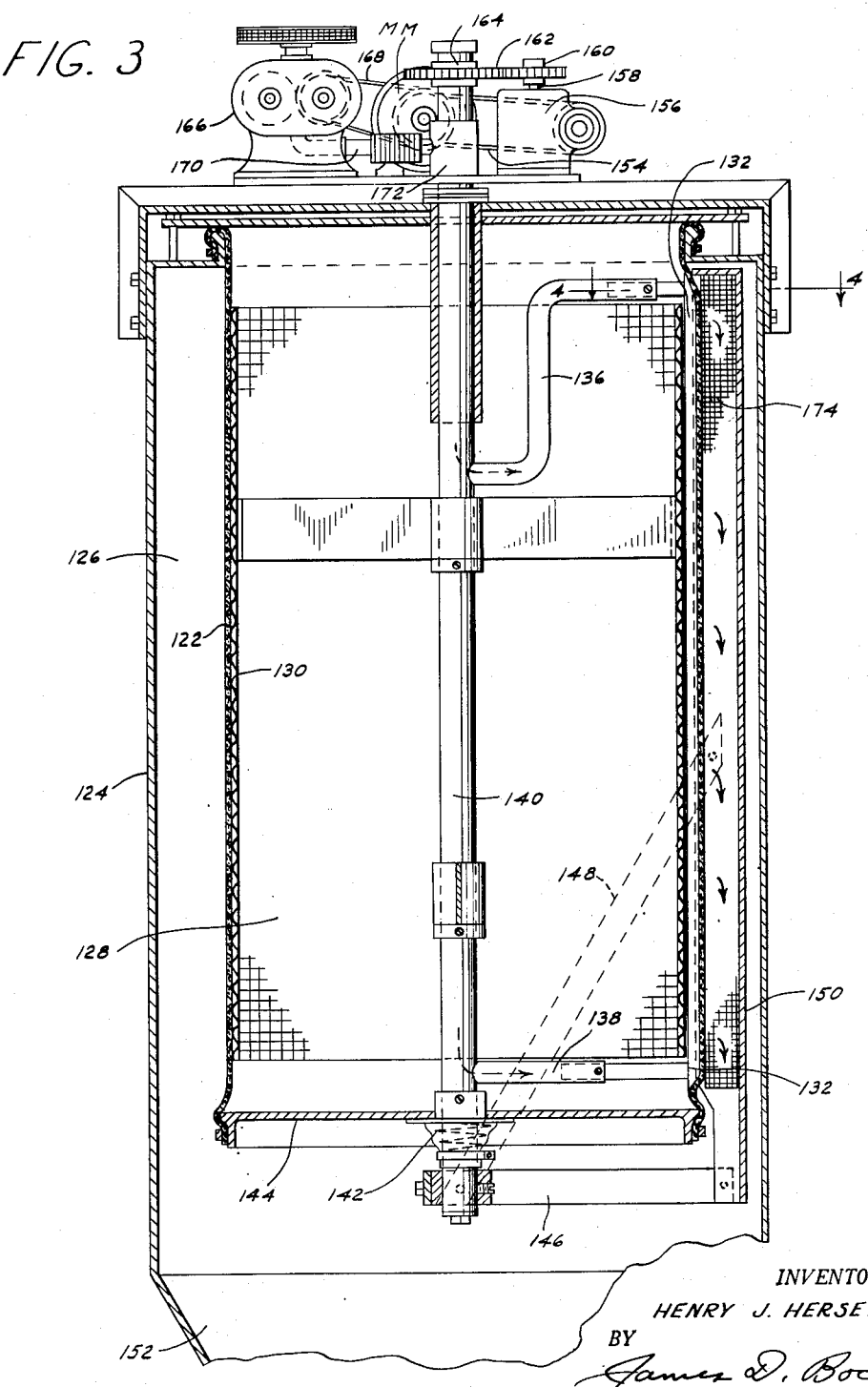

Sept. 14, 1954     H. J. HERSEY, JR     2,689,020
DUST FILTER

Filed Oct. 11, 1949     3 Sheets-Sheet 3

INVENTOR.
HENRY J. HERSEY, JR.
BY
ATTORNEY

Patented Sept. 14, 1954

2,689,020

UNITED STATES PATENT OFFICE 2,689,020

DUST FILTER

Henry J. Hersey, Jr., Chatham, N. J.

Application October 11, 1949, Serial No. 120,678

5 Claims. (Cl. 183—60)

The present invention relates to an improvement in dust filters and more particularly to an improvement in dust filters of the type disclosed in my co-pending application S. N. 683,018 filed July 12, 1946 now Patent No. 2,495,635, granted January 24, 1950.

In said Patent 2,495,635 I have disclosed as a preferred embodiment of the invention claimed therein, a generally cylindrical filter medium which receives dust laden gas in the interior thereof at a gaseous pressure somewhat greater than that existing on the exterior thereof whereby the dust is caused to be deposited upon the inner surface of the filter medium while the cleaned gas passes through it. Provision is made for dislodging accumulated solid particles from the interior surface of the filter medium when from time to time it becomes advisable to do so. The latter apparatus comprises a blow ring encircling the cylindrical filter medium and having an orifice in the form of an annular slot so located in the blow ring as to be in contact with the exterior surface of the filter medium. Air or other gas is supplied under relatively high pressure to said blow ring for discharge through said orifice and through the filter medium in a direction counter-current to the flow of cleaned gas through the filter medium. The jet of high pressure air thus supplied serves to dislodge at least a portion of the accumulated solid particles immediately opposite the orifice. Provision is made for moving the blow ring relative to the filter medium so that the cleaning operation may be extended to substantially the entire area thereof.

In the use of a dust filter of the type disclosed in said Patent No. 2,495,635, it has been observed, particularly with certain types of dust, that the operation of the blow ring tends to open crevices through the accumulated layer of solids leaving peak-like deposits of the solids between such crevices. These deposits frequently remain and actually increase in size in spite of repeated operative excursions of the blow ring. It is the object of the present invention to provide means for brushing or scraping the accumulated layer of solids to level out or prevent the formation of such peak-like deposits and thus to maintain the accumulated layer of solids substantially uniform in thickness and porosity. The maximum efficiency of a filter cleaning device of the general type disclosed in said co-pending application is realized when it operates on such a uniform layer. This vastly improves the efficiency of the filter itself from the standpoint of ability to handle adequate quantities of dust laden gas and from the standpoint of ability to separate extremely fine particles from the dust laden gas.

In the preferred embodiments of the present invention chosen for illustration herein, the brushing or scraping operation is performed by a strip of flexible foraminous material, which may consist of ordinary window screening, so mounted as to be movable relative to the side of the filter medium upon which accumulation occurs. Preferably a portion of the flat surface, rather than an edge, of the moraminous material is pressed relatively lightly into contact with the accumulated solids. The inherent resilience of a material such as bronze window screening is such that a strip thereof may be biased against the filter medium in a very simple manner. Furthermore it will accommodate itself to minor irregularities in shape of the filter medium and to the displacement thereof which occurs when a blow ring is used as disclosed in said co-pending application.

Other and further objects of the invention will become apparent upon consideration of the present detailed description of preferred, but not necessarily the only, forms of the invention taken in connection with the drawings accompanying and forming a part of this specification.

In the drawings:

Fig. 3 is a view similar to Fig. 1 showing a different form of dust filter and a modified embodiment of the present invention;

Figure 1:
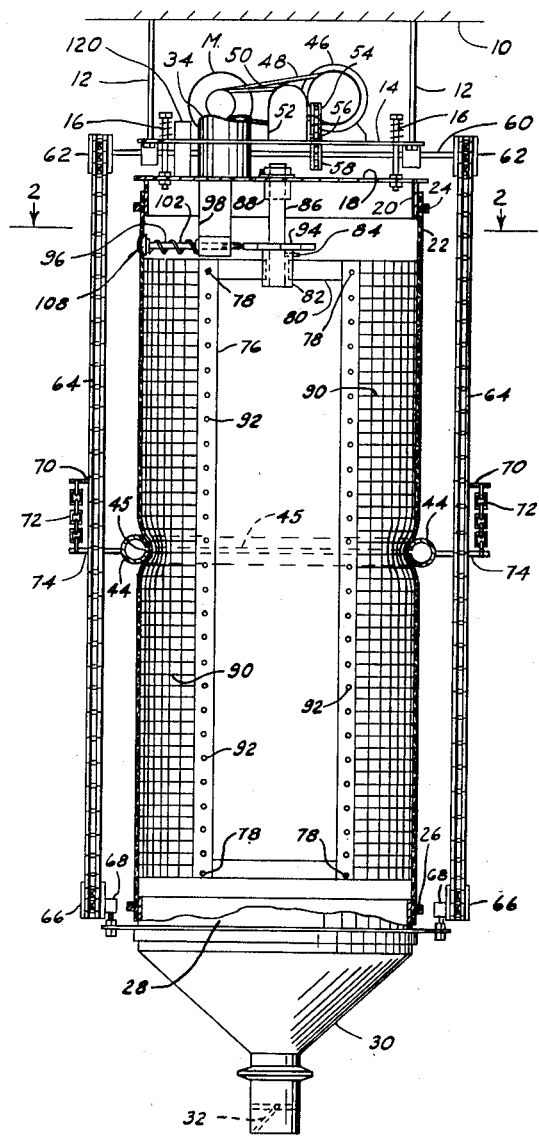
Fig. 1 is an elevational view with parts broken away and parts in section of one form of dust filter embodying the present invention.

Referring now to the drawings, there is shown in Fig. 1 a dust filter which, except for the parts added to embody the present invention, is substantially identical with that disclosed in my Patent No. 2,495,635 aforesaid. The filter is supported from an overhead structure 10 by means of rods 12 which are secured to a platform 14. The platform 14 in turn supports rods 16 which are secured to an upper cover member 18 for the filter. The member 18 may be a disc to which is secured a generally cylindrical body 20. A cylindrical filter medium 22 is secured as by clamp rings 24 to the body 20.

Preferably, as described in said Patent No. 2,495,635, the filter medium 22 is made of felt or of felt-like material in which the interstices are very much smaller than the thickness of the material. At its lower end, the filter medium 22 is secured as by a clamp ring 26 to the upper cylindrical portion 28 of a hopper or accumulator 30 provided with a suitable dumping valve 32 through which the solids accumulated in the hopper 30 may be discharged for disposal from time to time.

Dust laden gas is supplied to the filter by any suitable means (not shown). Such means may comprise a device for supplying the dust laden air at a pressure above atmospheric or alternatively the entire filter may be enclosed within a chamber from which the cleaned gas is withdrawn whereby to induce flow of the dust laden gas into the filter. In either event, the dust laden gas enters the filter through a supply opening 34 located in the cylindrical portion 20 of the upper cover member 18.

A blow ring 44 having an annular orifice or slot 45 is provided for dislodging the accumulated solid particles from the interior of the filter as described in said co-pending application. As shown in the drawings, the orifice 45 is in direct contact with the filter medium and the blow ring 44 has an inner diameter somewhat less than the outer diameter of the cylindrical filter medium 22 when inflated under pressure of the dust laden gas. The blow ring 44 thus deflects adjacent portions of the filter medium inwardly. The resultant bending of the filter medium serves to elongate the inner surface of the filter medium opposite the orifice 45 and thus to open the interstices adjacent such inner surface to facilitate dislodgement of solids therefrom by the jet of high pressure air emitted from the orifice 45.

Air or other gas is supplied to the below ring 44 preferably by a rotary blower of the positive pressure type such as shown at 46. The blower 46 is connected with the blow ring 44 by means of a flexible hose (not shown) preferably in the manner shown in said Patent No. 2,495,635. For supplying power to the blower 46 and to other movable parts of the device, a motor M may be mounted upon the platform 14. The motor M may be connected with the blower 46 by means of a belt 48.

The motor M is also connected, through a belt 50 with a speed reducer 52 carried by the platform 14. The low speed shaft of the speed reducer has fixed thereto a sprocket wheel 54 which drives a chain 56 extending through a suitable opening in the platform 14 and meshing with a sprocket 58 on a horizontally disposed shaft 60 to the opposite ends of which there are secured sprockets 62. The sprockets 62 engage chains 64 on both sides of the filter which pass around sprockets 66 mounted on adjustable brackets 68 at the lower portion of the filter.

Each of the chains 64 has fixed to one of the links thereof an arm 70 connected by a flexible chain 72 with an arm 74 fixed to the blow ring 44. The arms 74 extend from diametrically opposite points on the blow ring and outwardly between the two flights of the chains 72 so that, as the chains are driven through the mechanism described, they will carry the blow ring 44 upwardly and downwardly of the filter medium 12. The connecting chains 72 are of sufficient length to permit the arms 70 to pass around the sprockets at the upper and lower ends of the filter respectively.

As shown in said Patent No. 2,495,635, the connections between the blower 46 and the blow ring 44 includes an automatically operated valve which serves to shut off the air supply to the blow ring as it travels upwardly of the filter and to supply air to the blow ring as it travels downwardly of the filter. If preferred, such mechanism may be included in the filter herein disclosed.

The apparatus so far described is substantially that described in much greater detail in said Patent No. 2,495,635.

The improvement provided in accordance with the present invention comprises a generally rectangular frame 76 preferably made up of relatively light, flat metal stock held together as by bolts or rivets 78 at the four corners thereof or by welding at these points if preferred. The upper horizontal portion of the frame 70 may comprise two sections 80 which are received in a hub 82 and secured thereto as by welding. The hub 82 is fixed, as by a set screw 84, upon a vertically disposed shaft 86 mounted in a combined thrust and radial bearing 88 rigidly secured to the platform 14.

The frame 76 is therefore mounted for rotation about the axis of the cylindrical filter medium 22. Although any suitable mechanism may be provided to rotate the frame 76 two preferred types of such mechanism will be described hereinbelow.

Figure 2:
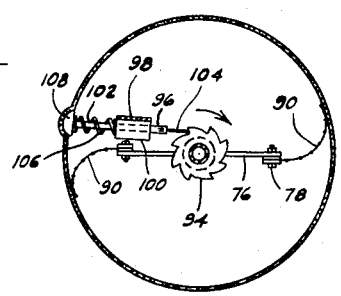
Fig. 2 is a section along the line 2—2 in Fig. 1.

As clearly shown in Figs. 1 and 2 the frame 76 extends substantially throughout the height of the filter. The width of the frame 76 is considerably less than the inner diameter of the filter medium 22. Thus, the frame 76 may serve as a simple and effective support for brushing elements of the type provided in accordance with the present invention.

As shown in said Figs. 1 and 2 brushing elements 90 are secured to the opposite sides of the frame 76 and extend generally radially into engagement with the inner surface of the filter medium 22. Preferably the elements 90 are wider than the radial distance between the edges of the frame 76 and the inner surface of the filter medium 22 whereby upon rotation of the frame 76 the brushing elements will bend backwardly and a considerable area of the flat surfaces thereof may be dragged along said inner surface. The pressure exerted upon said inner surface by the brushing elements 90 will therefore be dependent upon the particular characteristics of the material from which the brushing elements are made.

The brushing elements 90 may be made of a flexible and resilient material such as sheet rubber or plastic or they may be made of a foraminous material such as wire screen. A preferred material is wire screen of the type customarily used to screen residential windows. The latter material has been illustrated in the drawings.

The brushing elements 90 are secured to the frame 76 in any manner suitable for the particular material selected. For example, wire screening may be secured to the frame by closely spaced bolts or rivets 92 inserted in the vertical side members of the frame 76.

It will be apparent, from an inspection of Fig. 1 that the brushing elements 90 will yield inwardly of the filter to conform to the shape of those portions of the filter medium 22 which are displaced inwardly by the blow ring 44 in its travel to and fro vertically of the filter medium.

As stated above the brushing elements 90 may be moved by any suitable mechanism for rotating the frame 76. The rate of rotation should be quite slow although the precise rate selected will be dependent in some measure upon the type and quantity of dust being handled. The frame 76 may be rotated intermittently, as in Figs. 1 and 2, or continuously, as in Figs. 5 and 6.

In Figs. 1 and 2 there is illustrated a very simple mechanism for intermittently rotating the frame 76 which has the valuable feature that it is entirely enclosed within the filter. In said Figs. 1 and 2 the vertical shaft 86 of frame 76 has secured thereto a coarse-toothed ratchet wheel 94 and a pawl mechanism indicated generally at 96 which is actuated by the blow ring 44 when it moves into engagement with the pawl mechanism.

To this end a bracket 98 is secured to the cover 18 and carries a bearing 100 which slidably receives a rod 102. At its inner end the rod 102 is provided with a spring-metal pawl 104 which engages the radial portions of the teeth on ratchet wheel 94. The pawl 104 is sufficiently flexible to permit it to return to the position shown after each operative stroke under the influence of an expansive spring 106 extending between the bearing 100 and a head 108 formed on the outer end of the rod 102. The parts just described are of such dimensions that the head 108 will be pressed into engagement with the inner surface of the filter medium 22 by the spring 106 when the pawl 104 is in the position shown. It will be apparent that each time the blow ring 44 reaches the upper portion of its travel it will press inwardly on the portion of the filter medium 22 which overlies the head 108 and thus will move rod 102 and pawl 104 towards the right as viewed in Figs. 1 and 2 to rotate the frame 76 one step.

Figure 5:
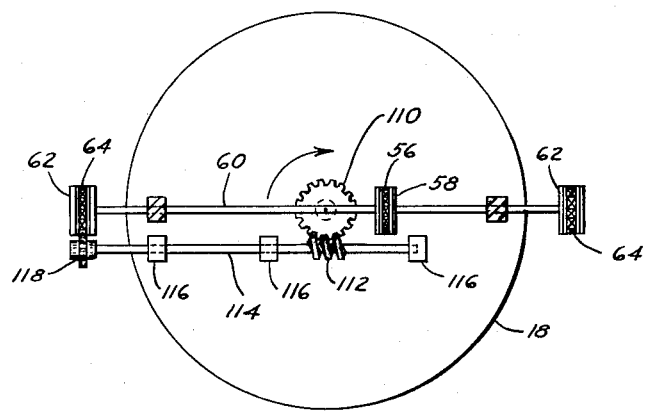
Figs. 5 and 6 are fragmentary plan and elevational views respectively of a modified form of driving means for the embodiment of the invention shown in Fig. 1.
Figure 6:
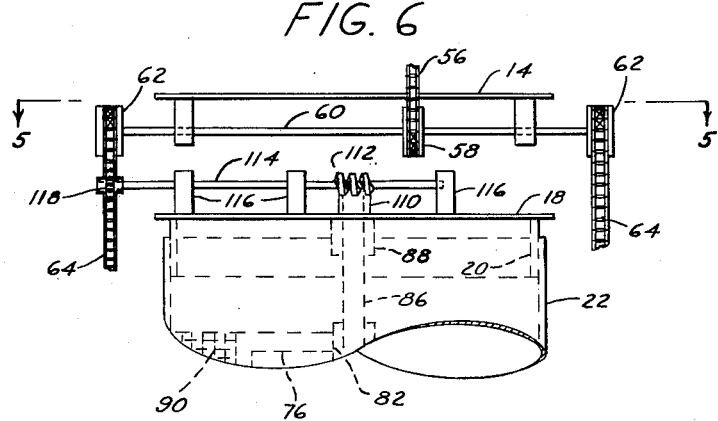

In Figs. 5 and 6 there is shown one illustrative mechanism for rotating the frame 76 continuously. In this embodiment the vertical shaft 86 has secured to its upper end a worm wheel 110 which meshes with a worm 112 fixed to a horizontal shaft 114 carried in suitable bearings 116 mounted on the cover 18. At its outer end the shaft 116 has fixed thereto a sprocket wheel 118 which engages one flight of the chain 64. The motion of chain 64 incident to the operation of the blow ring 44 is operative, through the mechanism just described, to slowly rotate the frame 76 and brushing elements 90 carried thereby. The speed of rotation may be established at a desired rate by proper selection of pitch for the worm 112 and worm wheel 110.

The principle of operation of either of the forms described above is the same in that the brushing elements 90 serve to level out or prevent the occurrence of irregularities in thickness of the layer of solid particles accumulated on the high pressure, or inner, surface of the filter medium 10. The blow ring 44 is thus enabled to operate upon a layer of accumulated particles which offers substantially uniform resistance to the jet of cleaning air and it is therefore possible to so arrange the supply of cleaning air and rate of travel of the blow ring as to remove a controlled amount of solids on each excursion of the blow ring. The advantage thus presented is apparent when it is borne in mind that it is not always necessary or desirable to strip the filter of its entire accumulation of solid particles. With the present combination of brushing elements and a reverse jet cleaning nozzle the high pressure side of the filter medium may have only a portion of the accumulated solids removed on each excursion of the blow ring whereby there is always maintained a sufficient accumulation of solids to act as a filter mat. In this manner the efficiency of the filter as regards retention of fine particles is always maintained.

While in some instances it may be desirable to operate the cleaning and brushing devices constantly during operation of the filter it usually is not necessary to do so. It has been found desirable to provide a control means responsive to the differential in pressure between the high pressure and low pressure sides of the filter medium which will cause the cleaning and brushing devices to operate only when such differential is sufficiently high to indicate that the accumulated layer of solids has become so thick as to unduly impede the flow of gas. To this end there is shown in Fig. 1 a switch 120 mounted on the cover 18 which is so connected in the power lines for motor M as to start and stop the motor in response to the differential in pressure between the inside and outside of the filter medium 22. The switch 120 preferably also is used in the form of the invention shown in Figs. 5 and 6. It will be apparent that in either form of the invention the operation of the blow ring 44, the blower 46 and the brushing elements 90 are thus under the control of switch 120.

When the switch 120 is provided in either of the combinations above described the efficiency of the filter may be maintained in regard to its capacity for handling adequate quantities of dust laden air in addition to the maintaining of retention efficiency by the brushing elements 90.

Figure 4:
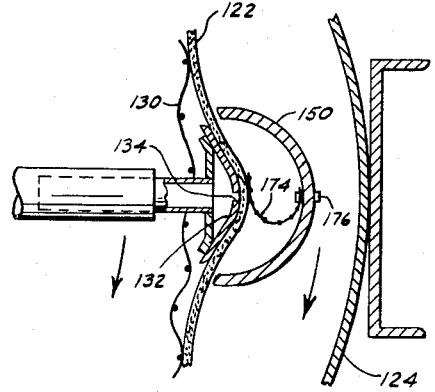
Fig. 4 is a section along the line 4—4 in Fig. 3.

In Figs. 3 and 4 there is shown a filter of the type disclosed and claimed in my Patent No. 2,559,428 granted July 3, 1951 and an embodiment of the present invention which is appropriate for a filter of that type. In such filter a generally cylindrical filter medium 122 is suspended within an enclosure 124. Dust laden gas is introduced through an inlet (not shown) to the outer zone 126 of the enclosure 124 and the solid particles are deposited upon the outer surface of the filter medium 122 as the cleaned gas passes therethrough to the central zone 128 from which it may escape through a suitable outlet (not shown).

The filter medium 122 is supported by a foraminous supporting frame 130 made of coarse-mesh wire screen which holds the filter medium in cylindrical shape in opposition to the pressure of the dust laden gas in the zone 126.

A reverse-jet cleaning device is provided which includes a blow-tube 132 which extends vertically between the support 130 and the low pressure side of the filter medium 122. An elongated orifice or slot 134 is formed in the blow tube 132 and extends substantially throughout the length thereof so as to engage a long narrow area of the low pressure side of the filter element. The blow tube 132 is supported by hollow arms 136 and 138 which extend over the upper end and below the lower end respectively of the supporting frame 130. The arms 136 and 138 are fixed to and in communication with a hollow vertical shaft 140 extending axially of the filter medium 122.

The shaft 140 is mounted for rotation about its vertical axis and also serves as a conduit for high pressure air which is supplied to the blow tube 132 through the hollow arms 136 and 138. Rotation of the shaft 140 serves to move the blow tube around the inner surface of the filter medium 122 so that the jet of air emitted from the orifice 134 may be effective to clean substantially the entire area of the outer or high pressure surface of the filter medium.

The shaft 140 extends through a dust sealed bearing 142 in a lower closure member 144 and carries a pair of spaced arms 146 (only one of which is shown) and a pair of angularly disposed curved brace members 148 (only one of which is shown). The arms 144 and brace members 148 support a generally semi-cylindrical receiver 150 which is placed opposite the orifice 134 and extends vertically throughout the length of the blow tube 132. As described in said Patent No. 2,559,428, the edges of the receiver 150 extend almost into contact with the outer surface of the filter medium 122 along vertical lines disposed on either side of the blow tube 132. The receiver 150 rotates in fixed relation with the blow tube 132 and serves, as described in said Patent No. 2,559,428, to conduct the material dislodged by the blow tube 132 directly to the lower zone or hopper 152 of the filter enclosure 124.

It will be noted, particularly in Fig. 4 that the extended surface of the slotted wall of the blow tube 132 is substantially commensurate with the width of the receiver 150 whereby the portion of the filter medium which lies therebetween at any given time is substantially isolated from the zone 126 of the filter whereby the dislodged material is free to gravitate through the receiver 150 without any tendency to redeposit upon the filter medium.

The shaft 140 and the blow tube 132 and receiver 150 carried thereby may be rotated by suitable mechanism located on the top of the filter. A motor MM is connected by a belt 154 with a speed reducer 156, the low speed shaft 158 of which carries a sprocket 160. A chain 162 connects the sprocket 160 with a sprocket 164 fixed to the upper end of shaft 140.

The motor MM also drives a blower 166, preferably of the positive pressure type, through a belt 168. The outlet side of the blower 166 is connected through a line 170 and hollow hub 172 with the interior of the hollow shaft 140 whereby to supply high pressure air to the blow tube 132 all substantially as described in said Patent No. 2,559,428.

The brushing or scraping device of the present invention is preferably located within the receiver 150 where it may operate upon the layer of solids substantially simultaneously with the operation of the reverse jet cleaning device.

To this end a brushing element 174 comprising a strip of appropriately flexible and resilient material of any of the types disclosed above but preferably of bronze wire window screening may be secured, as by bolts 176, within the receiver 150. The width of the brushing element 174 is preferably such that it will bend around as shown in Fig. 4 and resiliently press a flat surface thereof upon the filter medium opposite the orifice 134 of the blow tube 132. The brushing element is bent in such direction that it will drag along the layer of solids upon the filter medium 122, leveling the same as described above in connection with the other modifications of this invention.

It has been noted in operation of devices such as that shown in Figs. 3 and 4 the brushing element 174 serves the additional function of disturbing the solids directly subjected to the jet of cleaning air and thus greatly facilitating dislodgement thereof by said jet. This is true only when the brushing element actually engages the solids on the portion of the surface of the filter medium which is directly opposite the orifice 134. This additional function may be availed of or not, depending upon the degree of cleaning desired, by the simple expedient of positioning the brushing element 174 as shown in the drawings to achieve the additional function, or positioning it so that it engages the solids slightly ahead of or behind the orifice 134 to avoid the additional function.

As pointed out above it is preferred to use a foraminous material such as wire screen for the brushing elements 90 or 174. In addition to the advantages already mentioned such material has the added advantage of relative freedom from a tendency to become fouled with heavy accumulations of dust solids. The jet of air from the blow ring 44 or blow tube 132 is free to pass through the screen and thus to dislodge therefrom any accumulation of solids which might tend to form, particularly when solids of a sticky nature are being handled.

What is claimed is:

1. In a dust filter having a porous flexible filter medium, the combination of means for supplying dust laden gas to one side of said filter medium at a gaseous pressure higher than that existing on the other side whereby to deposit solids from said dust laden gas upon the high pressure side of said filter medium; a reverse jet cleaning device for said filter medium comprising a hollow member having an orifice therein disposed in contact with the low pressure side of said filter medium, means for supplying gas at a relatively high pressure to said hollow member for discharge through said orifice and through said filter medium whereby to dislodge accumulated solids from said high pressure side, and means for moving said cleaning device over the low pressure side of said filter medium for progressively cleaning substantially the entire area of the high pressure side thereof; a brushing element comprising a strip of flexible resilient woven screen yieldingly pressed against the accumulated solids on the high pressure side of said filter medium; and means for moving said brushing element over substantially the entire area of the high pressure side of said filter medium.

2. In a dust filter having a porous flexible filter medium, the combination of means for supplying dust laden gas to one side of said filter medium at a gaseous pressure higher than that existing on the other side whereby to deposit solids from said dust laden gas upon the high pressure side of said filter medium; a reverse jet cleaning device for said filter medium comprising a hollow member having an orifice therein disposed in contact with the low pressure side of said filter medium, means for supplying gas at a relatively high pressure to said hollow member for discharge through said orifice and through said filter medium whereby to dislodge accumulated solids from said high pressure side, and means for moving said cleaning device over the low pressure side of said filter meadium for progressively cleaning substantially the entire area of the high pressure side thereof; a brushing element comprising a strip of flexible resilient woven screen, means for mounting said screen in a position such that a portion of the flat face thereof is yieldingly pressed against the accumulated solids on the high pressure side of said filter medium; and means for moving said brushing element over substantially the entire area of the high pressure side of said filter medium.

3. In a dust filter having a porous flexible filter medium, the combination of means for supplying dust laden gas to one side of said filter medium at a gaseous pressure higher than that existing on the other side whereby to deposit the solids from said dust laden gas upon the high pressure side of said filter medium, a reverse jet cleaning device comprising an elongated hollow member having a long narrow orifice extending lengthwise thereof disposed in contact with the low pressure side of said filter medium, means for supplying gas at a relatively high pressure to said hollow member for discharge through said orifice and through said filter medium to dislodge accumulated solids from said high pressure side, a receiver located on the high pressure side of said filter medium comprising an elongated trough-like member having its open side disposed directly opposite said orifice and having the edges of the opening therein disposed adjacent to but out of contact with the high pressure side of said filter element on either side of said orifice whereby to receive the solids dislodged by said reverse jet cleaning device, means for moving said hollow member and said trough-like member jointly relative to said filter medium for progressively cleaning a substantial area thereof, and a brushing element secured to said receiver and yieldingly pressed against the accumulated solids on a portion of the high pressure side of said filter medium between the edges of the opening in said receiver and adjacent said orifice.

4. In a dust filter having a porous flexible filter medium, the combination of means for supplying dust laden gas to one side of said filter medium at a gaseous pressure higher than that existing on the other side whereby to deposit the solids from said dust laden gas upon the high pressure side of said filter medium, a reverse jet cleaning device comprising an elongated hollow member having a long narrow orifice extending lengthwise thereof disposed in contact with the low pressure side of said filter medium, means for supplying gas at a relatively high pressure to said hollow member for discharge through said orifice and through said filter medium to dislodge accumulated solids from said high pressure side, a receiver located on the high pressure side of said filter medium comprising an elongated trough-like member having its open side disposed directly opposite said orifice and having the edges of the opening therein disposed adjacent to but out of contact with the high pressure side of said filter element on either side of said orifice whereby to receive the solids dislodged by said reverse jet cleaning device, means for moving said hollow member and said trough-like member jointly relative to said filter medium for progressively cleaning a substantial area thereof, and a brushing element secured to said receiver and yieldingly pressed against the accumulated solids on a portion of the high pressure side of said filter medium between the edges of the opening in said receiver and directly opposite said orifice.

5. In a dust filter having a porous flexible filter medium, the combination of means for supplying dust laden gas to one side of said filter medium at a gaseous pressure higher than that existing on the other side whereby to deposit the solids from said dust laden gas upon the high pressure side of said filter medium, a reverse jet cleaning device comprising an elongated hollow member having a long narrow orifice extending lengthwise thereof disposed in contact with the low pressure side of said filter medium, means for supplying gas at a relatively high pressure to said hollow member for discharge through said orifice and through said filter medium to dislodge accumulated solids from said high pressure side, a receiver located on the high pressure side of said filter medium comprising an elongated trough-like member having its open side disposed directly opposite said orifice and having the edges of the opening therein disposed adjacent to but out of contact with the high pressure side of said filter element on either side of said orifice whereby to receive the solids dislodged by said reverse jet cleaning device, means for moving said hollow member and said trough-like member jointly relative to said filter medium for progressively cleaning a substantial area thereof, and a brushing element comprising a strip of flexible resilient woven screen secured to said receiver and extending substantially throughout the length thereof, said brushing element being bent along its length to yieldably press a portion of the flat face of said screen into engagement with the accumulated solids on the high pressure side of said filter medium between the edges of the opening in said receiver.

References Cited in the file of this patent

UNITED STATES PATENTS

| Number | Name | Date |
|--------|------|------|
| 2,364,877 | Smellie | Dec. 12, 1944 |
| 2,405,129 | Bible | Aug. 6, 1946 |
| 2,474,478 | Hart | June 28, 1949 |
| 2,495,635 | Hersey | Jan. 24, 1950 |

FOREIGN PATENTS

| Number | Country | Date |
|--------|---------|------|
| 269,707 | Great Britain | Apr. 28, 1927 |
| 343,085 | Great Britain | Feb. 13, 1931 |